(12) United States Patent
Gould et al.

(10) Patent No.: US 8,345,857 B2
(45) Date of Patent: Jan. 1, 2013

(54) METHOD FOR REDUCING NON-VALUE ADDED TIME BETWEEN CALLS SERVICED AT A CALL CENTER

(75) Inventors: Garett W. Gould, Troy, MI (US); Mark Gibb, Fenton, MI (US); Jonathan W. Johnson, Lake Orion, MI (US); Scott A. Kubicki, Rochester Hills, MI (US); Terry M. Inch, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 1132 days.

(21) Appl. No.: 12/239,738

(22) Filed: Sep. 26, 2008

(65) Prior Publication Data
US 2010/0080377 A1 Apr. 1, 2010

(51) Int. Cl.
*H04M 3/00* (2006.01)
(52) U.S. Cl. .......... 379/266.06; 379/265.01; 379/265.09
(58) Field of Classification Search ............. 379/265.01, 379/265.09, 266.06
See application file for complete search history.

(56) References Cited

U.S. PATENT DOCUMENTS

| 5,926,528 | A | 7/1999 | David |
| 6,359,982 | B1 | 3/2002 | Foster et al. |
| 6,563,920 | B1 | 5/2003 | Flockhart et al. |
| 2006/0062376 | A1* | 3/2006 | Pickford .................. 379/265.12 |
| 2006/0239440 | A1 | 10/2006 | Shaffer et al. |
| 2008/0118051 | A1* | 5/2008 | Odinak et al. ........... 379/265.09 |
| 2009/0161849 | A1* | 6/2009 | Minnich et al. .......... 379/112.01 |

* cited by examiner

*Primary Examiner* — Rasha Al Aubaidi
(74) *Attorney, Agent, or Firm* — Dierker & Associates, P.C.

(57) ABSTRACT

A method for reducing non-value added time between calls serviced at a call center includes selectively enabling an after-call-work state that is configured to be activated during a call from a subscriber vehicle when an advisor at the call center indicates a need for the after-call-work state. If the advisor does not activate the after-call-work state during the call, then upon completion of the call, automatically setting an operator station of the advisor to a call ready state. If, however, the advisor activates the after-call-work state during the call, then upon completion of the call, the method includes activating the after-call-work state.

15 Claims, 4 Drawing Sheets

METHOD FOR REDUCING NON-VALUE ADDED TIME BETWEEN CALLS SERVICED AT A CALL CENTER

TECHNICAL FIELD

The present disclosure relates generally to a method for reducing non-value added time between calls serviced at a call center.

BACKGROUND

Call centers employ one or more advisors to service calls from a number of subscriber vehicles. Typically, after an advisor has serviced a call, the advisor is allotted a predetermined amount to time to engage in after-call-work (ACW), where the advisor completes any necessary documentation or other work related to the call. When the advisor is finished with his/her ACW, the advisor's operator station is then placed in a ready state to service a new call.

SUMMARY

As disclosed herein, a method for reducing non-value added time between calls serviced at a call center includes selectively enabling an after-call-work state that is configured to be activated during a call from a subscriber vehicle when an advisor at the call center indicates a need for the after-call-work state. If the advisor does not activate the after-call-work state during the call, upon completion of the call, the method includes automatically setting an operator station of the advisor to a call ready state. If, on the other hand, the advisor activates the after-call-work state during the call, upon completion of the call, the method includes activating the after-call-work state.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method disclosed herein advantageously reduce non-value added time in-between calls serviced at a call center. This is accomplished by automatically setting an advisor's operator station, at the call center, to a ready state instead of an after-call-work state. The automatic initiation of the ready state enables an advisor to receive a call as soon as the advisor completes a previous call. This automatic setting or default state may be overridden by the advisor, for example, when the advisor indicates a need for performing work after the call has ended. By automatically setting the advisor's operator station to a ready state for a new call, the amount of time in-between servicing calls is believed to be significantly reduced. This reduction in time advantageously increases the operation efficiency at the call center by allowing the advisors to service more calls. It is to be understood that the automatic or default setting for an advisor of a specialty team may be the after-call work state, if such an advisor typically performs additional work upon completion of servicing a call.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
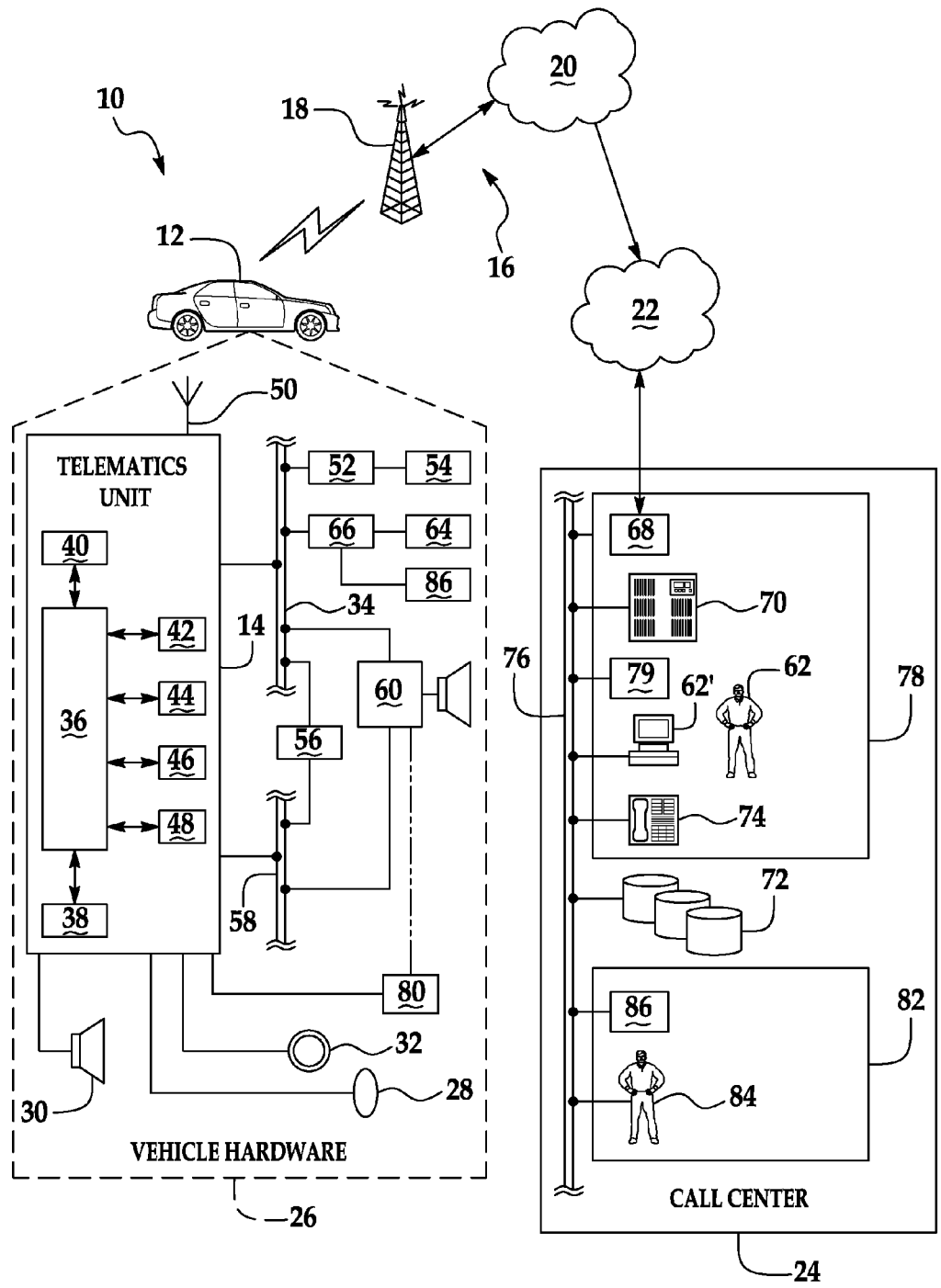
FIG. 1 is a schematic diagram depicting an example of a system for reducing non-value added time between calls serviced at a call center.

Referring now to FIG. 1, the system 10 includes a vehicle 12, a telematics unit 14, a wireless carrier/communication system 16 (including, but not limited to, one or more cell towers 18 and/or one or more base stations and/or mobile switching centers (MSCs) 20, which are generally owned and/or operated by one or more cellular service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30, and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, the previously mentioned short-range wireless communication network 48 (e.g., a Bluetooth® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the real-time clock (RTC) 46. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as Bluetooth®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of the telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the vehicle occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. According to the example shown here, the call center 24 generally includes a call servicing system 78 for servicing calls from one or more subscriber vehicles, including vehicle 12. The call servicing system 78 includes one or more switches 68 and servers 70, in addition to the live and/or automated advisors 62, 62'. The call servicing system 78 further includes an operator station 79 that is operable by the live advisor 62 for receiving and servicing calls from the subscriber vehicle such as, for example, the vehicle 12. Further, the operator station 79 is configured with one or more algorithms adapted to i) automatically set the operator station 79 to a default call ready state upon completion of a call with the subscriber vehicle 12, and ii) override the default call ready state if the advisor 62 activates an after-call-work state during the call with the subscriber vehicle 12. The operation of this/these algorithm(s) will be discussed in further detail below in connection with at least some example(s) of the method for reducing non-value added time in-between calls serviced by the advisor 62 at the call center 24.

The call center 24 also includes at least one specialty team 82 configured to handle specific types of calls received from subscriber vehicles. For example, if a subscriber has a question about his/her bill balance, the call may be directed (via the switch 68 at the call center 24, which will be described in further detail below) to a team that specializes in answering billing-related questions. Calls directed to the specialty team 82 are serviceable using a specialty team operator station 86, which is operated by a specialty team advisor 84. Similar to the advisor operator station 79, the specialty team operator station 86 is also configured with one or more algorithms. This/these algorithms, however, are adapted to 1) automatically set the operator station 86 to an after-call-work state upon completion of a subscriber's call if the specialty team commonly uses after-call-work, 2) override the after-call-work state with a call ready state if the specialty team advisor 84 determines that he/she does not need to activate the after-call-work state. The operation of these algorithm(s) will also be described in further detail below in connection with some example(s) of the method for reducing non-value added time in-between calls serviced at the call center 24.

The call center 24 further includes one or more databases 72 for storing data in a user/subscriber user profile, where such data includes, e.g., a subscriber's name, address, phone number, e-mail address, account information, billing information, and/or the like. In some instances, personal information of the subscriber may also be stored in one or more of the databases 72. Such personal information may be used by the advisor 62, for example, to authenticate the subscriber when the subscriber requests services from the call center 24. Any of the information stored in the databases 72 may be retrieved by the advisor 62 via the operator station 79 at any time while servicing the subscriber's call.

It is to be understood that the components of the call servicing system 78 and the specialty team 82 work together to service calls from subscriber and/or potential subscriber vehicles 12. In some instances all of the components may be utilized to service a call, and in other instances, less than all of the components may be utilized to service calls. Furthermore, while the database 72 is shown as being outside of the call servicing system 78 and the specialty team 82, it is to be understood that one or more of the components of the system 78 or team 82 may access the database(s) 72 to assist in servicing calls.

The call center 24 further includes a variety of other telecommunication and computer equipment 74 that is known to those skilled in the art. The various components of the call center 24 are each coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing.

It is to be understood that the switch 68 may also route incoming signals so that voice transmissions are sent directly to a specialty team advisor 84. The switch 68 is able to send a voice transmission directly to a specialty team advisor 84 when the incoming caller's profile indicates that he/she should talk to a particular specialty team 82. Upon receiving a signal indicative of an incoming voice transmission, the modem at the call center 24 performs a handshake with the modem 42 of the telematics unit 14 in which data communication takes place, and the unique ID of the telematics unit hardware is handed off to the call center modem to identify the caller. Once the caller is identified, then access to the profile associated with the recognized caller may be gained. If the profile indicates that the subscriber's call should be routed to a specialty team 82, then the switch 68 routes the call as such. As a non-limiting example, the user's profile may be flagged because his/her credit card has been declined when automatic minute renewal has been attempted. When this user calls the call center 24, the switch 68 will automatically transmit the call, upon recognizing the flagged profile, to the billing specialty team 82. In other instances, the switch 68 automatically routes the caller to a specialty team if the caller routinely calls for a particular service that is serviceable via a specialty team advisor 84.

In other instances, the switch 68 directs an incoming voice transmission to the live advisor 62 or the automated response system 62', which in turn determines whether to transfer the call to a specialty team advisor 84. For example, if the caller requests a service that is fulfilled by a specialty team 82 (e.g., purchasing of additional calling minutes/units), the live advisor 62 or the automated response system 62' will transfer the call to the telephone services specialty team.

The modem at the call center 24 includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

It is to be understood that, although a cellular service provider (not shown) may be located at the call center 24, the call center 24 is a separate and distinct entity from the cellular service provider. In an example, the cellular service provider is located remote from the call center 24. A cellular service provider generally provides the user with telephone and/or Internet services. The cellular service provider is generally a wireless carrier (such as, for example, Verizon Wireless®, AT&T®, Sprint®, etc.), while the call center 24 is a telematics services provider. It is to be understood that the cellular service provider may interact with the call center 24 to provide such service(s) (in addition to wireless phone and/or Internet services) to the user.

Figure 2:
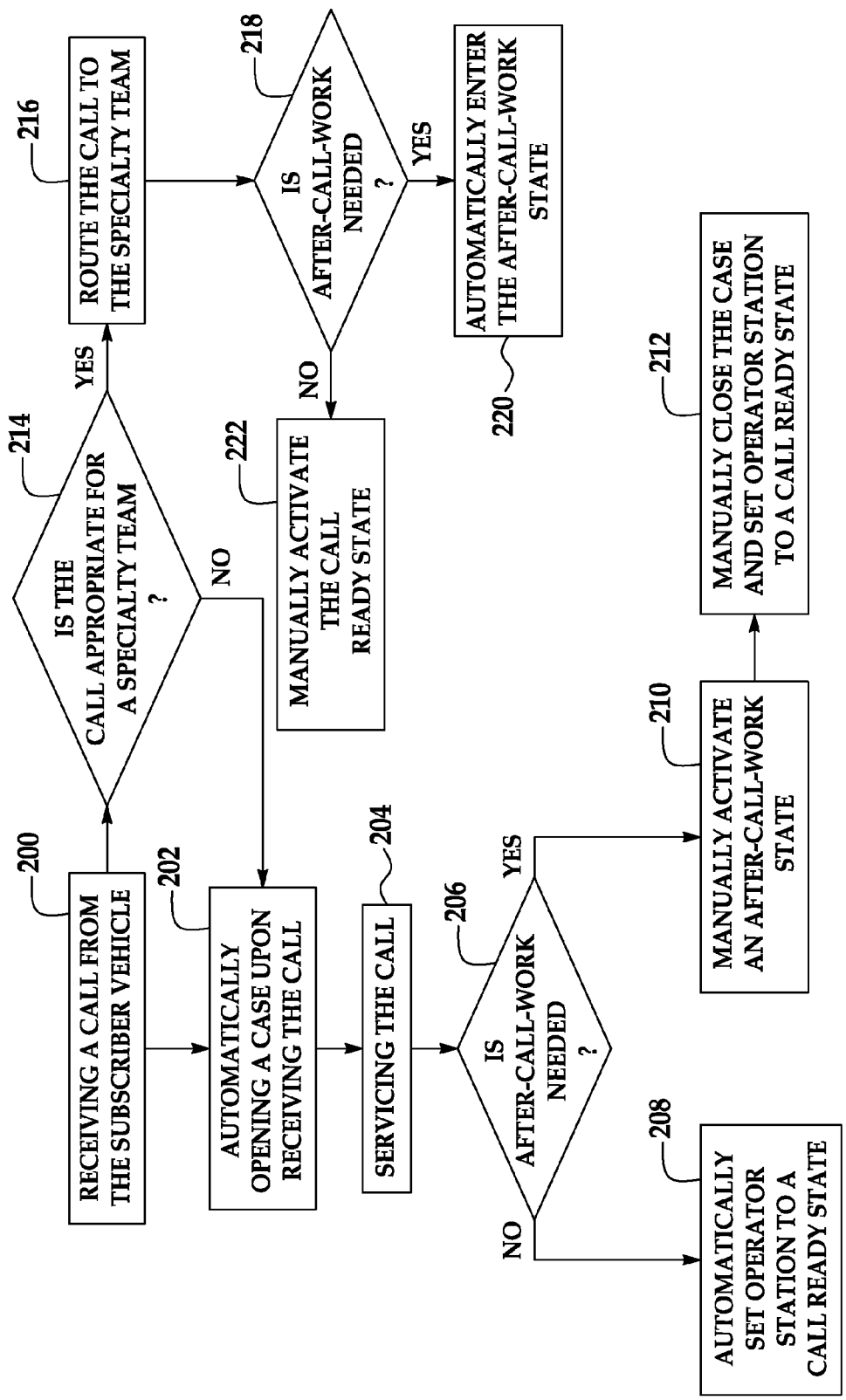
FIG. 2 is a flow diagram depicting examples of the method for reducing non-value added time between calls serviced at a call center.

Examples of the method of reducing non-value added time between calls serviced at the call center 24 is shown in FIG. 2. The method begins by receiving, at the call center 24, a call from the subscriber vehicle 12 (as shown by reference numeral 200). An operator, passenger, or other person in the subscriber vehicle 12 may physically initiate the call with the call center 24. Such physical initiation may be accomplished via a button press, touch screen, or the like located in the vehicle 12. It is to be understood that the button press or touch screen is operatively connected to the telematics unit 14. Upon the user's initiation of the button press or touch screen, the telematics unit 14 signals the call center 24 of the fact that the user has initiated a call.

In one example, the switch 68 at the call center 24 directs the user's call to the advisor 62 at the call servicing system 78. The advisor 62, upon receiving the call, opens a case for the subscriber's call (as shown by reference numeral 202) and the advisor 62 services the call (as shown by reference numeral 204). A case is a new or a previously existing document that enables the advisor 62 (or in some instances, the advisor 84) to insert and save information pertaining to the call. The advisor 62, 84 is able to create and/or modify the case via a computer program and/or software configured for the creation/manipulation of such documents.

In some instances, the advisor's operating station 79, via one or more of the algorithms stored therein, automatically creates a new case for each call that is received by the advisor 62. In other instances, the advisor's operating station 79, via one or more of the algorithms stored therein, opens an existing case that is particular to the current caller. For example, the caller's profile may have stored therein a case which logs all phone calls he/she makes to the call center 24.

Figure 3:
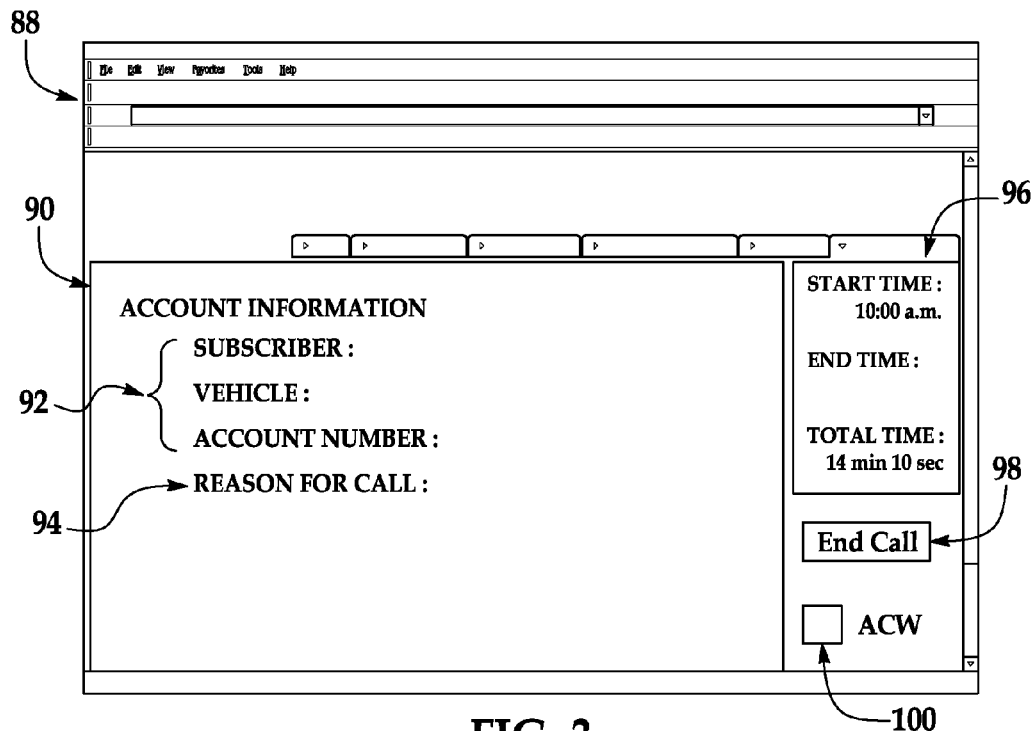
FIG. 3 is an example of an advisor's operator station while the advisor is servicing a call from a subscriber.

FIG. 3 illustrates an example of an initial screen 88 that is available to the advisor 62 when he/she opens a new case via the advisor operator station 79. Displayed on the screen 88 is a workspace panel 90 including a workspace for inputting identification information 92 of the subscriber including, e.g., the subscriber's name, the subscriber's vehicle make and/or model, and the subscriber's account number, as well as some workspace for logging in information related to the call 94. It is to be understood that when the advisor opens a previously existing case associated with the caller, the identification information 92 may already be inputted.

Once the new or previously existing case is opened, the screen 88 also displays a time panel 96 indicating the time that the case was opened and the total amount of time accumulated throughout the duration of the call. While servicing the call, the advisor 62 logs in any pertinent information into the workspace panel 90. The case may then be saved in the subscriber's profile in at least one of the databases 72 as a record of that call.

Referring now to FIGS. 2 and 3 together, during the connection with the subscriber, the advisor 62 determines whether or not additional work is required in the case upon completion of the call (as shown by reference numeral 206). As a non-limiting example, additional work may be needed when the advisor 62 performs a live fix of the subscriber's problem or walks the subscriber through a setup process (e.g., roadside assistance). Upon completion of the call, the advisor 62 documents the details of what was accomplished during the call (e.g., the name of the roadside provider, the agent's name, billing time, etc.). When such additional work is required and since the caller is no longer on the line when such work is to be performed, it is desirable that the advisor's operator station 79 be in the after-call-work state so that additional calls may not be received while the advisor 62 is performing the after call work.

If the advisor 62 determines that he/she does not need to perform after-call-work, upon completion of the conversation with the subscriber, the advisor 62 finishes the call by selecting the "End Call" (or other similarly labeled) button 98 on the screen 88 (as shown in FIG. 3), or checking a box associated with ending the call (not shown). When the "End Call" button 98 is actuated, the advisor operator station 79 saves and closes the then-current case, and automatically sets itself to a call ready state (i.e., a state in which the advisor operator station 79 is ready for the next call), as shown at reference numeral 208. In this example, all of the information input via the advisor 62 occurs during the call. As previously mentioned, such information is saved throughout the call and/or when the advisor 62 uses the "End Call" button 98. The case is saved in the subscriber's profile. It is to be understood that when the "End Call" button 98 is pressed, a record including both the start time (i.e., when the case is opened) and the end time of the call (i.e., when the case is closed) is made and stored with the case in the user's profile. A total time representing the duration of the case may also be recorded.

In some instances, during the call with the subscriber, the advisor 62 determines that he/she will need to activate the after-call-work state upon completion of the call. As previously mentioned, this state is desirable when additional work pertaining to the case needs to be performed after the call is completed. In these instances, the advisor 62 selectively enables the after-call-work state (as shown by reference numeral 210). In an example, as shown in FIG. 3, the after-call-work state may be enabled or activated via the advisor 62 checking a box 100 associated with the after-call-work state that is displayed on the screen 88 of the operator station 79. In another example (not shown in the figures), the advisor 62 may enable or activate the after-call-work state by actuating an "ACW" (or other similarly labeled) button displayed on the screen 88 of the operator station 79. Referring to the example set forth in FIG. 3, checking the ACW box 100 triggers the operator station 79 to enter the after-call-work state whenever the call is ended. When the ACW box 100 is checked and the connection between the subscriber and the advisor 62 is ended, the case remains open to allow the advisor 62 to engage in after call work.

It is to be understood that when the after call work is completed, the advisor 62 is able to manually close the case (which is saved in the user's profile). When the operator station 79 recognizes that the case is closed, it automatically resets to the call ready state (i.e., the box 100 is unchecked). The call ready state indicates to the switch 68 that the advisor 62 is ready to receive and service another call.

Referring back to FIG. 2, in an example, when the call center 24 receives a call from the subscriber vehicle 12 (as shown at reference numeral 200), a determination may be made as to whether the call should be routed to a specialty team 82 (as shown by reference numeral 212). As previously described hereinabove, the switch 68 may access the subscriber's profile and determine whether or not the call should be routed to a specialty team 82. As provided hereinabove, the subscriber's profile may be flagged so that the call is automatically sent to a particular specialty team 82, or the call may be automatically routed to a particular specialty team 82 if it is recognized that the caller routinely requests a service that is serviceable by that particular specialty team 82. In yet other instances, the call is routed to a specialty team 82 after the user requests a particular service and the advisor 62, 62' recognizes that such a service is fulfilled via a particular specialty team 82. Still further, the user may indicate that they wish to speak to a specialty team 82 by responding (verbally or physically via a touch screen) to menu options presented in the vehicle 12.

If the switch 68 determines that the subscriber's call is not appropriate for a specialty team 82, the switch 68 routes the call to the advisor 62 who services the call. If the advisor 62 has already received the call and determines that the call is not appropriate for a specialty team 82, the advisor 62 simply services the call. In either instance, when a call is received, a case is automatically opened for that call (as shown by reference numeral 202).

If, on the other hand, the switch 68 or advisor 62 determines that the subscriber's call is appropriate for a specialty team 82, the switch 68 or advisor 62 then routes the call to the appropriate specialty team 82, as shown at reference numeral 214. Upon receiving the call, a case is automatically opened for that call via the specialty team operating station 86.

Upon opening the case, an initial screen displayed on the specialty team operator station 86 is available to the advisor 84. It is to be understood that, in some instances, the initial screen displayed on the specialty team operator station 86 is the same as the initial screen 88 of the advisor's operator station 79. This initial screen 88 is used by specialty teams 82 who generally do not engage in after call work, or do not often use the after-call-work state. Non-limiting examples of such specialty teams 82 include a sales team or a declined credit card team that processes all of the information during the call. In determining whether or not a specialty team operator station 86 should have the ready state as the default state, usage of the after-call-work state for that specialty team 82 is evaluated. If the team's usage of the after-call-work state does not exceed a predetermine value (e.g., if ACW is performed on less than or equal to 50% of the calls received), the ready state is set as the default state of the operator station 86 for that specialty team 82. When the ready state is set as the default state, the specialty team's initial screen 88 will include the unchecked ACW box 100 previously described. As such, the after-call-work state may be selectively enabled during the call by the specialty team advisor 84 if the specialty team advisor 84 determines that after-call-work is needed. In this case, the advisor 84 can manually switch from the default call ready state to the after-call-work state by checking the ACW box 100.

Figure 4:
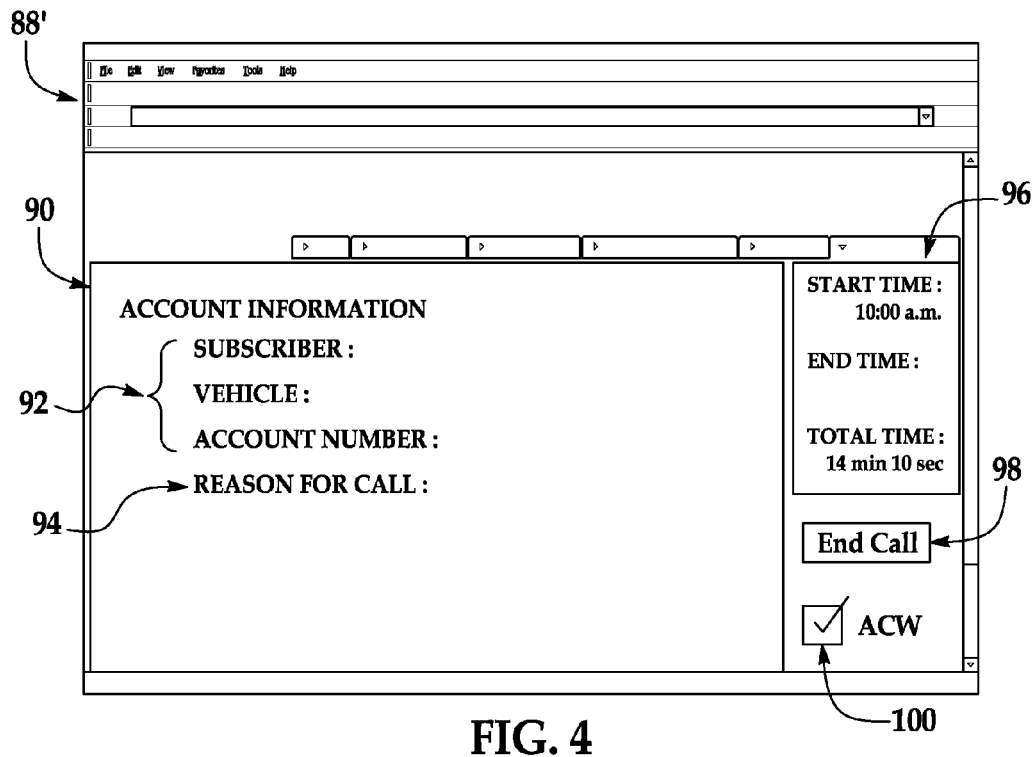
FIG. 4 is an example of a specialty team advisor's operator station while the specialty team advisor is servicing a call from a subscriber.

While some specialty teams 82 may utilize initial screen 88 and have the ready state as the default state, other specialty teams 82 may utilize an initial screen 88' that is slightly different than the initial screen 88. A non-limiting example of this initial screen 88' is shown in FIG. 4. Such a screen 88' is suitable for specialty teams 82 who readily use the after-call-work state and have the ACW state as the default state. Non-limiting examples of such specialty teams 82 include technical assistance teams, customer care teams, or any other team that provides coaching or verbal resolution to a subscriber's problem/issue during the call and then needs to document the details of the call after the subscriber hangs up. The usage of the ACW state for specialty teams 82 having the ACW state as the default state has been determined to exceed a predetermined time (e.g., if ACW is performed on more than 50% of the calls received). When the usage of the after-call-work state exceeds this value, the ACW state is set as the default state of the operator station 86 for that specialty team 82. When the ACW state is set as the default state, the specialty team's initial screen 88' will include the check box 100 associated with the ACW state displayed thereon with a checkmark displayed in the box 100 (as shown in FIG. 4). Referring to the example in FIG. 4, the ready state may be selectively enabled during the call by the specialty team advisor 84 if the specialty team advisor 84 determines that after-call-work is not needed. In this case, the advisor 84 can manually switch from the default ACW state to the ready state by unchecking the check box 100 prior to completion of the call. In another example (not shown in the figures), the specialty team advisor 84 may enable or activate the ready state by actuating a "Call Ready" (or other similarly labeled) button on the screen 88' of the operator station 86.

The "predetermined value", when referring to the specialty team's usage of the after-call-work state, may be any desirable value. The default predetermined value may be 51%. In many instances, a specialty team 82 that has the ACW state as the default state will use the after-call-work state for more than 90% of its calls on average, and likewise, a specialty team 82 that has the ready state as the default state will use the after-call work state for less than 10% of its call on average. In an example, a business owner utilizing the operator stations 79, 86 would define the predetermined value, and a system administrator would set the required default states.

With reference now to FIGS. 2 and 4 together, when the specialty team's 82 usage of the ACW state exceeds the predetermined value and the default state for the operator station 86 is the ACW state, the specialty team advisor 84 determines (during a call with a subscriber) whether or not the after-call-work state is actually needed (as shown by reference numeral 216). If the after-call-work state is needed, then the specialty team operator station 86 automatically enters the after-call-work state upon completion of the call, as shown by reference numeral 218. If, however, the after-call-work state is not needed, the after-call-work state may be overridden and the ready state may be selectively enabled by the specialty team advisor 84 (as shown by reference numeral 220). As shown in FIG. 4 and as previously mentioned, the initial screen 88' of the specialty team operator station 86 for the specialty teams 82 that have the after-call-work state as the default state may be configured with a checkmark in the check box 100 associated with the ACW state. The call ready state may be enabled by the specialty team advisor 84 by unchecking the check box 100 if the advisor 84 determines that after-call-work is not needed. Upon unchecking the check box 100, the then-current call is disconnected, the instant case is closed, and the specialty team operator station 86 is automatically switched to the call ready state.

Figure 5:
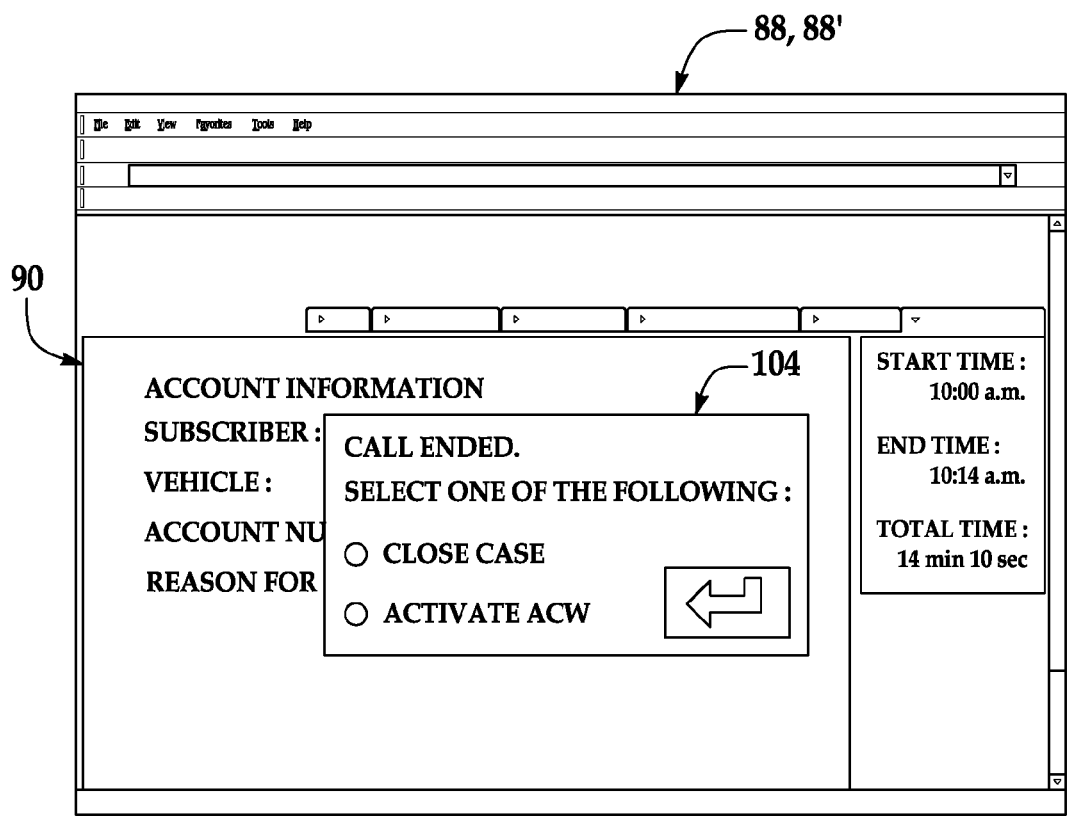
FIG. 5 is an example of an advisor's operator station when a call the advisor is servicing is disconnected via means other than the advisor.

In some cases, while the advisor 62, 84 is servicing a call, the call may be dropped prior to fulfilling the requested service (e.g., the cellular network fails), or the subscriber vehicle 12 ends the call before the advisor 62, 84 does. The operator station 79, 86 is programmed to recognize when one of these events occurs and, upon such recognition, to automatically set the operator station 79, 86 to the call ready state. In an example, as shown in FIG. 5, a prompt 104 may appear over the workspace 90 of the initial screen 88, 88', asking the advisor 62, 84 if he/she would like to 1) close the case and enable the call ready state, or 2) activate the after-call-work state. The advisor 62, 84 selects (e.g., via a mouse click or a touch screen) one of the listed options. If the advisor 62, 84 selects to close the case, the advisor's operator station 79, 86 is switched to the call ready state. If the advisor 62, 84 selects to activate the after-call-work state, the operator station 79, 86 is switched to the after-call-work state. After completing any work, the advisor 62, 84 manually closes the case and the operator station 79, 86 enters the call ready state.

While several examples have been described in detail, it will be apparent to those skilled in the art that the disclosed examples may be modified. Therefore, the foregoing description is to be considered exemplary rather than limiting.

The invention claimed is:

1. A method of reducing non-value added time between calls serviced at a call center, the method comprising:
   setting a default state of an operator workstation of a call center advisor by:
      evaluating usage of an after-call work state for a team of advisors; and
      setting the default state to i) the after-call work state when the usage of the after-call work state occurs for more than 50% of calls received by the team of advisors, or ii) a call ready state when the usage of the after-call work state occurs for less than or equal to 50% of calls received by the team of advisors;
   enabling an other state of the operator workstation of the call center advisor, the other state being one of the after-call work state or the call ready state and being other than the default state, and the other state being configured to be selectively activated during a call from a subscriber vehicle when the call center advisor indicates that there is a need for the other state; and
   i) if the call center advisor does not activate the other state during the call, then upon completion of the call, automatically setting the operator station of the call center advisor to the default state; or ii) if the call center advisor activates the other state during the call, then upon completion of the call, automatically setting the operator station of the call center advisor to the other state.

2. The method as defined in claim 1, further comprising:
   receiving, by the advisor at the call center, the call from the subscriber vehicle;
   opening a case upon receiving the call; and
   servicing the call.

3. The method as defined in claim 2 wherein after the advisor activates the other state, and the other state is an after-call work state, the method further comprises:
   engaging in work during the after-call-work state;
   upon completing the work, via the advisor, closing the case; and
   upon closing the case, automatically switching to the default state.

4. The method as defined in claim 2, further comprising:
   recognizing, via the operator station of the advisor, that the call has been dropped or that the subscriber vehicle has completed the call;
   upon such recognition and prior to automatically setting the operator station to the default state, inquiring as to whether the advisor would like to i) close the case, or ii) activate the other state; and
   selecting, by the advisor, to either i) close the case, or ii) activate the other state.

5. The method as defined in claim 1 wherein the default state is set to the after-call-work state and the team of call center advisors is a specialty team, and wherein the method further comprises:
   receiving, at the call center, the call from the subscriber vehicle;
   determining whether the call is appropriate for the specialty team;
   routing the call to the specialty team;
   upon completion of the call, automatically entering the after-call-work state; and
   switching to the call ready state upon completing work in the after-call-work state.

6. The method as defined in claim 1 wherein the default state is set to the after-call-work state and the team of call center advisors is a specialty team, and wherein the method further comprises:
   receiving, at the call center, the call from the subscriber vehicle;
   determining whether the call is appropriate for the specialty team;
   routing the call to the specialty team;
   during the call, recognizing that the after-call-work state will not be utilized;
   during the call, overriding the default state with the call ready state; and
   upon completion of the call, automatically entering the call ready state.

7. The method as defined in claim 1 wherein the team of call center advisors is a specialty team, and the usage of the after-call work state for the specialty team is less than or equal to 50% of the calls received by the specialty team, and wherein the method further comprises:
   setting the default state of the operator station to the call ready state; and
   selectively enabling the after-call-work state during the call such that a specialty team advisor can manually switch from the call ready state to the after-call-work state.

8. The method as defined in claim 1 wherein the team of advisors is a specialty team, and wherein the method further comprises:
   receiving, at a call servicing system in the call center, the call from the subscriber vehicle;
   determining whether the call is appropriate for the specialty team, the determining being accomplished by the call servicing system by i) accessing a subscriber profile that is flagged, or ii) recognizing a routine request for a service that is serviceable by the specialty team; and
   then routing, by a switch at the call center, the call to the specialty team.

9. A system of reducing non-value added time between calls serviced at a call center, the system comprising:
   a subscriber vehicle in selective communication with the call center; and
   an advisor operator station at the call center configured with one or more algorithms to:
      i) set a default state of the advisor operator station by:
         evaluating usage of an after-call work state for a team of advisors;
         setting the default state to i) the after-call work state when the usage of the after-call work state occurs for more than 50% of calls received by the team of advisors, or ii) a call ready state when the usage of the after-call work state occurs for less than or equal to 50% of calls received by the team of advisors;
      ii) set an other state of the advisor operator station, the other state being one of the after-call work state or the call ready state, and the other state being other than the default state;
      iii) enable the other state to be selectively activated during a call from the subscriber vehicle when a call center advisor indicates that there is a need for the other state;
      iv) automatically set the advisor operator station to the default state upon completion of the call with the subscriber vehicle when the call center advisor does not activate the other state during the call, and
      v) override the default state when the call center advisor activates the other state during the call.

10. The system as defined in claim 9 wherein the other state is the after-call work state, and wherein the one or more algorithms are further to:
   enable the call center advisor to open a case in response to receiving the call;
   enable the advisor to engage in work during the after-call-work state when the call center advisor activates the after-call work state;
   enable the advisor to close the case upon completing the work; and
   automatically switch to the call ready state upon recognizing that the advisor has closed the case.

11. The system as defined in claim 9 wherein the other state is the after-call work state, and wherein the one or more algorithms are further to:
   recognize that the call has been dropped or that the subscriber vehicle has completed the call;
   upon the recognition and prior to automatically setting the operator station to the default state, inquire as to whether the advisor would like to i) close the case, or ii) activate the after-call-work state; and
   enable the advisor to i) close the case, or ii) activate the after-call-work state.

12. The system as defined in claim 9, wherein the team of advisors is a specialty team at the call center, and wherein the system further comprises a specialty team operator station configured to have the after-call-work state as the default state when usage of the after-call work state for the specialty team exceeds 50% of the calls received by the specialty team.

13. The system as defined in claim 12 wherein the default state is set to the after-call-work state, and wherein the specialty team operator station is further configured to:
   automatically enter the after-call-work state after the call with the subscriber vehicle is complete; and
   switch to the call ready state upon completing work in the after-call-work state.

14. The system as defined in claim 12 wherein the default state is set to the after-call-work state, and wherein the specialty team operator station is further configured to:
   enable a specialty team advisor at the call center to override the default state with the call ready state upon recognizing, during the call, that the after-call-work state will not be utilized;
   recognize that the specialty team advisor has overridden the default state; and
   automatically enter the call ready state upon completion of the call.

15. The system as defined in claim 12, further comprising:
   means for determining if the call qualifies as a call for the specialty team; and
   a switch, at the call center, for delivering the call to the specialty team.

* * * * *